(12) United States Patent
Von Der Ohe et al.

(10) Patent No.: US 9,573,834 B2
(45) Date of Patent: Feb. 21, 2017

(54) NOZZLE FOR TEMPERING DEVICE

(75) Inventors: Renate Von Der Ohe, Fontenay Sous Bois (FR); Sebastien Thuillier, Compiegne (FR); Fouad Fahl, Compiegne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 201 days.

(21) Appl. No.: 13/990,279

(22) PCT Filed: Nov. 29, 2011

(86) PCT No.: PCT/FR2011/052804
§ 371 (c)(1),
(2), (4) Date: May 29, 2013

(87) PCT Pub. No.: WO2012/072939
PCT Pub. Date: Jun. 7, 2012

(65) Prior Publication Data
US 2013/0255319 A1 Oct. 3, 2013

(30) Foreign Application Priority Data
Dec. 1, 2010 (FR) ...................... 10 59968

(51) Int. Cl.
*C03B 27/04* (2006.01)
*B05B 1/00* (2006.01)
(52) U.S. Cl.
CPC ........... *C03B 27/0404* (2013.01); *B05B 1/005* (2013.01)
(58) Field of Classification Search
CPC . C03B 27/0404; C03B 27/0408; F26B 21/004
See application file for complete search history.

(56) References Cited

U.S. PATENT DOCUMENTS 3,388,984 A   6/1968 Leflet, Jr. et al.
3,398,467 A * 8/1968 Brown .................. F26B 21/004
                                                       34/233

(Continued)

FOREIGN PATENT DOCUMENTS

BE        518 344     2/1955
EP      1 462 420     9/2004
JP    2000 281370    10/2000

OTHER PUBLICATIONS

Machine translation BE518344 performed on ESPACENET EPO website Mar. 7, 2015.*

(Continued)

*Primary Examiner* — Lisa Herring
(74) *Attorney, Agent, or Firm* — Oblon, McClelland, Maier & Neustadt, L.L.P.

(57) ABSTRACT

A device for cooling sheets of glass by jets of air emitted by at least one nozzle in a form of a pipe, including a box supplying the nozzle with air, airflow ejected via an ejection orifice of the nozzle passing successively through a conical part, of which an internal section is reduced in a flow direction, and then through a cylindrical part including the ejection orifice, of which an internal section corresponds to a smallest internal section of the conical part and to an internal section of the ejection orifice. The cylindrical part of the nozzle has a length greater than 6 times the diameter of the ejection orifice. The device achieves a high level of heat exchange when the sheets of glass are cooled, which makes it possible to increase reinforcing effect on the glass and/or to reduce power of fans used to convey air through the nozzles.

36 Claims, 1 Drawing Sheet

(56) References Cited

U.S. PATENT DOCUMENTS

| | | | |
|---|---|---|---|
| 4,578,102 A * | 3/1986 | Colmon et al. | 65/114 |
| 5,611,151 A * | 3/1997 | Jacob | 34/395 |
| 2006/0191292 A1 | 8/2006 | Carlomagno | |
| 2008/0276485 A1* | 11/2008 | Pucciani et al. | 34/500 |
| 2010/0163653 A1* | 7/2010 | Pucciani | 239/557 |

OTHER PUBLICATIONS

Zalmanzon, "Components for Pneumatic Control Instruments", Pergamon Press Ltd., pp. 1-41, 1965.*

Graebel, "Engineering Fluid Mechanics", Published by Taylor & Francis, p. 508, 2001.*

Swagelok, "Hose and Flexible Tubing", Catalog pp. 1-88, Nov. 2009.*

French Search Report Issued Jul. 7, 2011 in Application No. FR 1059968 Filed Dec. 1, 2010.

International Search Report Issued Mar. 7, 2012 in PCT/FR11/052804 Filed Nov. 29, 2011.

* cited by examiner

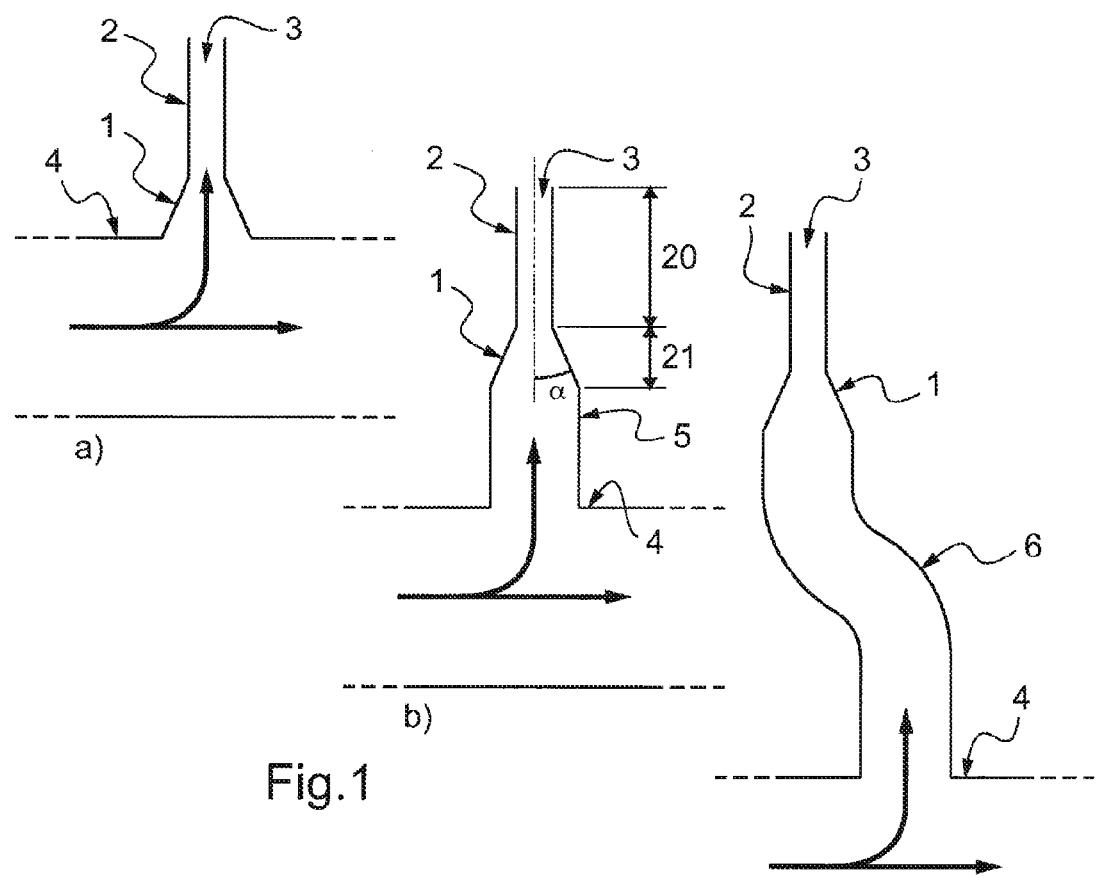
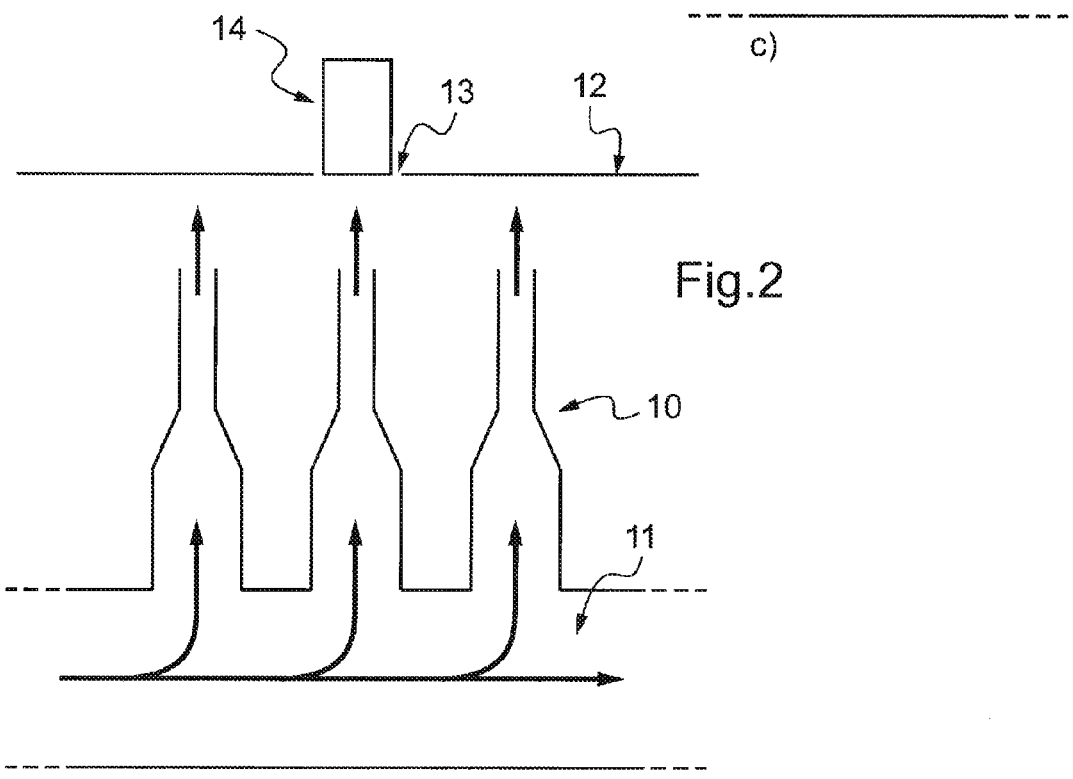
Fig.1
Fig.2

NOZZLE FOR TEMPERING DEVICE

BACKGROUND

The invention relates to a device for cooling sheets of glass by jets of air emitted by nozzles.

The rapidity with which glass is cooled affects its mechanical properties and, in particular, its behavior relative to impacts and its surface hardness. It is possible to allow the glass to cool slowly, generally in a float glass lehr. In this case, the final glass is able to be cut but when it fractures it is transformed into large pieces with sharp edges which is sometimes regarded as unsatisfactory in terms of safety. To provide the glass with improved shock-proof properties (fracture into small blunt pieces) it is possible to semi-harden, harden or temper the glass, which may be obtained by more rapid cooling. This accelerated cooling of the glass is generally implemented by blowing cold air onto the hot glass via nozzles.

Numerous types of nozzles have already been disclosed. In particular, WO00/23387, WO99/12855, WO2006/076215, U.S. Pat. No. 3,881,907 teach nozzles in the form of pipes which are placed horizontally beneath the moving sheets and of which the length (horizontally) corresponds to the width of the sheets to be cooled. The nozzles are perforated with holes or comprise a slot for the ejection of air towards the glass. Thus the nozzle in this case is a horizontal pipe closed at one end and arranged transversely relative to the direction of movement of the glass.

U.S. Pat. No. 3,393,062 teaches nozzles in the form of tubes terminated by a cone, of which the section is increased in the direction of flow of the airflow. U.S. Pat. No. 2,948,990, U.S. Pat. No. 4,519,829 and U.S. Pat. No. 4,578,102 teach nozzles in the form of tubes terminated by a cone, of which the section is reduced in the direction of flow of the airflow.

U.S. Pat. No. 5,562,750 teaches conical nozzles of which the section is increased in the direction of flow of the airflow, the nozzle being terminated by a grille.

SUMMARY

The nozzle according to the invention provides a high level of heat exchange when the glass sheets are cooled. This makes it possible to increase the reinforcing effect on the glass and/or to reduce the power of the fans used to convey air through the nozzles. The increase in the reinforcing effect is translated by an increase in the number of pieces of glass per surface unit in a rupture test, for example according to the ECE R43 standard. The exchange coefficient obtained by the nozzle is not only good relative to the point of the surface of the glass directly opposite the orifice for ejecting air via the nozzle but also at a certain distance around this point, in particular up to 30 cm.

The nozzle is intended to provide a device for cooling sheets of glass by blowing air which is colder than the glass. The cooling provides hardening of the surface (the term hardening covering semi-hardening and tempering). For this cooling process, the air starts to be blown when the glass is at a temperature of at least 580 and generally at least 610° C. At the start of the blowing process, the glass is generally at a temperature ranging between 610 and 650° C. The air emitted by the nozzle is generally air at ambient temperature or slightly heated as it is driven by a fan which is slightly heated (the temperature of the blown air generally ranges between 0 and 60° C., or even hotter depending on the operating conditions.)

The invention also relates to a device comprising a plurality of nozzles according to the invention. Said nozzles are fixed to at least one box supplied with air. The nozzles receive the cooling air from the box.

At least one fan forces the air to circulate from the box to the nozzles.

The invention primarily relates to a device for cooling sheets of glass by jets of air emitted by at least one nozzle in the form of a pipe, comprising a box supplying said nozzle with air, characterized in that the airflow ejected via the ejection orifice of the nozzle passes successively through a conical part, of which the internal section is reduced in the flow direction, and then through a cylindrical part comprising the ejection orifice, of which the internal section corresponds to the smallest internal section of the cone and to the internal section of the ejection orifice.

The nozzle according to the invention takes the form of a pipe in at least two parts. It comprises a conical part of which the internal diameter is reduced in the direction of the airflow, followed by a cylindrical part of which the internal diameter corresponds to the smallest internal diameter of the cone to which it is attached. In this case it is a pipe, i.e. a channel comprising an external envelope and an internal envelope separated by a wall of which the thickness generally ranges between 0.5 and 5 mm, more generally between 0.5 and 2 mm. The external envelope generally has the same shape as the internal envelope of the pipe whilst naturally being larger due to the thickness of the wall. A plurality of nozzles are combined in a blowing device to blow in substantially the same direction. The fact that the nozzles take the form of pipes implies that they are separated from one another by a free space. Generally, there is no connecting piece joining one nozzle to another, naturally apart from the box to which the nozzles are fixed on their side opposing the orifice for the ejection of gas. In particular, the nozzle may be fixed to the box by the large diameter of the conical part thereof (large cone base). The nozzle may also comprise a tubular part between the box for supplying gas and the large base of the conical part thereof. Generally said tubular part has an internal section which is never less than the internal section of the conical part in the region of the large base of the cone.

The fact that the nozzles are clearly separated from one another has the following advantages:
 the blown air is easily discharged,
 in the event of fracture of a sheet of glass, the pieces fall into said free spaces without interrupting the movement of the following sheets.

The invention essentially relates to nozzles in the form of pipes having a length which is generally greater than 50 mm and preferably greater than 100 mm. Generally, the length of the nozzle is less then 300 mm. The lengths provided above relate to the overall length of the nozzle, from the box for supplying cooling gas to the orifice for the ejection of said gas. The cylindrical part of the nozzle including the orifice for the ejection of gas has a length which is greater than 6 times the diameter of the orifice for the ejection of gas and more preferably greater than 8 times the diameter of the ejection orifice. Generally, the cylindrical part of the nozzle has a length which is less than 20 times the diameter of the ejection orifice. The diameter of the ejection orifice is generally greater than 4 mm. The ejection orifice is generally of a diameter less than 20 mm. Preferably, the diameter of the ejection orifice ranges between 6 and 15 mm and more generally between 8 and 12 mm. Naturally, the diameter of the ejection orifice is the internal diameter of the pipe in the region of the ejection orifice.

The conical part is able to occupy the remainder of the length of the nozzle relative to the cylindrical part. Said conical part generally has a length which is greater than 10 mm. It generally has a length which is less than 270 mm. Generally, the ratio of the large diameter of the conical part to the small diameter of the conical part is greater than 1.2. Generally the ratio of the large diameter of the conical part to the small diameter of the conical part is less than 4. Generally, the large diameter of the conical part is less than or equal to 40 mm. Generally, the half-angle at the apex of the conical part is 7° to 35° and more generally 10° to 25°.

The nozzle may also comprise an additional tubular part located between the box for supplying gas and the large base of the conical part. Generally, said tubular part has an internal section which is never less than the internal section of the conical part in the region of the large base of the cone. Generally, said additional tubular part has a uniform internal section and is equal to the internal section of the conical part in the region of the large base of the cone. Said additional tubular part may have a non-linear shape so as to be able to place the jet of air in the correct position. In particular, it is possible to make use of the shape of said additional tubular part to position the ejection orifice between the rollers of a bed for conveying sheets of glass, or at least so that the axis of the ejection orifice of the nozzle (said axis passing in the blowing direction via the nozzle) passes between two conveying rollers, so that the blowing air is able to reach directly the sheet of glass conveyed via said rollers. Such a conveying roller bed comprises a plurality of rollers of which the axes are parallel or form angles which are generally less than 30° C. (angles between the axes of adjacent rollers). Generally, the length of said additional tubular part (length measured along its profile, i.e. straightened if it is not linear) is less than 10 times its internal diameter.

The values of the diameters provided above are equivalent diameters (diameter of a circle of the same surface area) in the case where the pipe would not have a circular section overall. However, generally, the pipe (nozzle) is of circular section over its entire length.

The sheets of glass may, in particular, be cooled when they are moved, by the air blown by the nozzles according to the invention. In particular, the sheets of glass may move at a speed of 100 to 600 mm per second.

Generally the orifice for the ejection of air is at a distance from the glass corresponding to 0.5 to 10 times the diameter of said ejection orifice.

The invention also relates to a method for preparing a sheet of glass comprising the heating of said sheet, then the cooling thereof by the device according to the invention. In particular, hardening is obtained by the cooling process, in particular when it is a case of tempering. The sheet of glass is able to move during the emission of air.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1a) illustrates a nozzle with a conical part followed by a cylindrical part in accordance with one example;

FIG. 1b) illustrates a nozzle with a conical part followed by a cylindrical part and an additional cylindrical part in accordance with one example;

FIG. 1c) illustrates a nozzle with a conical part followed by a cylindrical part and an additional non-linear cylindrical part in accordance with one example; and FIG. 2 illustrates a device used to measure the efficiency of the nozzle.

DETAILED DESCRIPTION

FIG. 1 shows various nozzles according to the invention. Said nozzles consist of a pipe comprising a conical part 1 followed by a cylindrical part 2. The air is discharged toward the glass via the ejection orifice 3. The nozzle is fixed to a box 4. In the case of the nozzle of FIG. 1a), the nozzle is fixed to the box 4 in the region of the large base of its conical part. In the case of the nozzle of FIG. 1b), an additional cylindrical (or tubular) part 5 precedes the conical part over the path of the air. The internal diameter of said additional cylindrical part 5 corresponds to the internal diameter of the large base of the cone of the conical part (the same applies to the internal sections). For the nozzle of FIG. 1b) is shown what is understood as the length 20 of the cylindrical part and as the length 21 of the conical part, in addition to the half-angle α at the apex of the conical part, said angle generally ranging from 7° to 35°, and more generally from 10° to 25°. In the case of the nozzle of FIG. 1c), an additional non-linear tubular part 6 precedes the conical part over the path of the air. The internal section of this additional tubular part 6 is uniform and corresponds to the internal section of the large base of the cone of the conical part. It is possible to make use of the shape of said additional tubular part 6 to be able to position the ejection orifice between two conveyor rollers of a roller bed for conveying sheets of glass. The arrows in the box 4 represent the circulation of the cooling air.

FIG. 2 shows the device used to measure the efficiency of the nozzle according to the invention, in particular in the context of Examples 1 to 3. Three nozzles 10 are supplied with air at ambient temperature by the same box 11. The air is blown onto a metal plate 12 which is heated and provided with a fluxmeter sensor 14 located in an orifice 13 formed in the plate 12. The fluxmeter 14 is flush with the plate 12. Said device makes it possible to estimate the heat exchange coefficient between the blown air and the plate.

The devices shown in FIGS. 1 and 2 are not to scale.

Examples 1 to 3

Three different types of nozzle were compared relative to their efficiency to cool a surface. Said nozzles took the following form:

1. a nozzle according to the invention combining in the order of passage of the cooling gas (in the direction from the box for supplying air toward the ejection orifice), a cone having a length of 110 mm and an internal outlet diameter of 10 mm and an internal inlet diameter of 22 mm, followed by a cylinder having a length of 110 mm and an internal diameter of 10 mm;

2. a nozzle according to the prior art; straight nozzle consisting of a cylinder having an internal diameter of 10 mm and a length of 220 mm (comparative example);

3. a nozzle according to the prior art; conical nozzle consisting of a cone having a length of 220 mm, of which the diameter of the outlet orifice is 10 mm and the air inlet diameter is 22 mm (comparative example).

For each test, about twenty nozzles of the same shape were mounted perpendicularly on a plate closing a box supplied with air by a fan. The nozzles formed lines and were spaced apart from one another and in a line by 40 mm (from axis to axis). The lines were spaced apart from one another by 60 mm and arranged such that the nozzles were staggered. The air pressure in the box was 2500 mm of water column (mmWC). The air was blown perpendicularly onto a plate made of steel provided with a heat fluxmeter sensor. The fluxmeter sensor was mounted flush with the plate (i.e. not protruding over the plate). Then the plate was displaced (and thus also the fluxmeter sensor) in a transverse direction relative to the direction of the airflow to measure the cooling efficiency as a function of the distance relative to the blowing axis.

The results are collated in Table 1. The results are provided for the distances of 0, 8 and 16 mm from the center of the nozzle array. The values are heat exchange coefficient values in $W/m^2K$ (heat flux/difference between the air temperature and the temperature of the surface of the plate).

| Ex. No. | Nozzle shape | 0 mm | 8 mm | 16 mm |
|---|---|---|---|---|
| 1 | Straight + conical nozzle | 775 | 700 | 830 |
| 2 (comp) | Straight nozzle | 750 | 650 | 740 |
| 3 (comp) | Conical nozzle | 650 | 600 | 720 |

Examples 4 to 6

Six tempering boxes are provided with 160 nozzles on each box. Three boxes formed a first group to blow onto the upper face of the sheets and three boxes formed a second group to blow onto the lower face of the sheets. The sheets were driven horizontally to pass between the two groups of boxes via a roller bed.

The two following types of nozzle were compared in two separate tests:
a) Example 4: a nozzle according to the invention combining (in the order of passage of the cooling gas) a cone having a height of 20 mm and an outlet diameter of 10 mm and an inlet diameter of 16 mm, followed by a cylinder having a length of 110 mm and a diameter of 10 mm; a cylinder having a diameter of 16 mm and a length of 90 mm was located upstream of the cone; the ratio of the length of the cylinder to the ejection diameter is thus 11.
b) Example 5 (comparative example): a nozzle according to the prior art; straight nozzle consisting of a cylinder having an internal diameter of 10 mm and a length of 220 mm;
c) Example 6 (comparative example): a nozzle combining (in the order of passage of the cooling gas) a cone having a height of 50 mm and an outlet diameter of 10 mm and an inlet diameter of 16 mm, followed by a cylinder having a length of 50 mm and a diameter of 10 mm; a cylinder having a diameter of 16 mm and a length of 120 mm was located upstream of the cone; the ratio of the length of the cylinder to the ejection diameter is thus 5.

The nozzles were in a staggered arrangement. The air pressure in the boxes was 2700 mm of water column (mmWC).

The dimensions of the sheets of glass were 50×50 cm, with a thickness of 3.15 mm. They arrived between the upper and lower box at 630° C. and at a speed of 230 mm per second. The cooling zone occupied by the boxes was 1 m relative to the horizontal. The orifice for the ejection of air from the nozzles was 20 mm from the glass.

After tempering, a fragmentation test was carried out on the tempered sheets according to the ECE R43 standard. To achieve the same number of fragments, it is possible to gain 6% in the speed of rotation in the case of nozzles according to the invention when compared with nozzles of Examples 5 and 6. This gains 25% in terms of electrical energy. If it were decided to keep the same fan speed, approximately 60% more fragments would be observed in the case of nozzles according to the invention during a rupture test.

Examples 5 and 6 lead substantially to the same results.

The invention claimed is:

1. A device for cooling sheets of glass by jets of air emitted by at least one nozzle in a form of a pipe, comprising:
a box supplying the at least one nozzle with air, wherein airflow ejected via an ejection orifice of the at least one nozzle passes successively through a conical part, of which an internal section is reduced in a flow direction, and then through a cylindrical part comprising the ejection orifice, of which an internal section corresponds to a smallest internal section of the conical part, and to the internal section of the ejection orifice and the airflow ejected via the ejection orifice is configured to blow air on the sheets of glass; and
a roller bed conveying the sheets of glass, an axis of the ejection orifice passing between two rollers of the roller bed,
wherein the cylindrical part of the at least one nozzle having a length which is greater than 6 times the diameter of the ejection orifice,
wherein the at least one nozzle further comprises an additional tubular part located between a large base of the conical part and the box,
wherein the internal section of the additional tubular part is equal to a largest internal section of the conical part and
wherein the additional tubular part is non-linear.

2. The device as claimed in claim 1, wherein the cylindrical part of the at least one nozzle has a length which is greater than 8 times the diameter of the ejection orifice.

3. The device as claimed in claim 1, wherein the cylindrical part of the at least one nozzle has a length which is less than 20 times the diameter of the ejection orifice.

4. The device as claimed in claim 1, wherein the diameter of the ejection orifice is greater than 4 mm and less than 20 mm.

5. The device as claimed in claim 1, wherein the diameter of the ejection orifice ranges between 6 and 15 mm.

6. The device as claimed in claim 5, wherein the conical part has a length which is greater than 10 mm.

7. The device as claimed in claim 1, wherein the conical part has a length which is less than 270 mm.

8. The device as claimed in claim 1, wherein the half-angle at the apex of the conical part is 7° to 35°.

9. The device as claimed in claim 8, wherein the half-angle at the apex of the conical part is 10° to 25°.

10. The device as claimed in claim 1, comprising a plurality of nozzles.

11. The device as claimed in claim 1 further comprising a fan to convey air through the at least one nozzle.

12. The device as claimed in claim 1, wherein said additional tubular part connects with said box at a location that is not on said axis of the ejection orifice.

13. The device as claimed in claim 12, wherein the cylindrical part of the at least one nozzle has a length which is greater than 8 times the diameter of the ejection orifice.

14. The device as claimed in claim 12, wherein the cylindrical part of the at least one nozzle has a length which is less than 20 times the diameter of the ejection orifice.

15. The device as claimed in claim 12, wherein the diameter of the ejection orifice is greater than 4 mm and less than 20 mm.

16. The device as claimed in claim 12, wherein the diameter of the ejection orifice ranges between 6 and 15 mm.

17. The device as claimed in claim 16, wherein the conical part has a length which is greater than 10 mm.

18. The device as claimed in claim 12, wherein the conical part has a length which is less than 270 mm.

19. The device as claimed in claim 12, wherein the half-angle at the apex of the conical part is 7° to 35°.

20. The device as claimed in claim 19, wherein the half-angle at the apex of the conical part is 10° to 25°.

21. The device as claimed in claim 12, comprising a plurality of nozzles.

22. A device for cooling sheets of glass by jets of air emitted by at least one nozzle in a form of a pipe, comprising:
a box supplying the at least one nozzle with air, wherein airflow ejected via an ejection orifice of the at least one nozzle passes successively through a conical part, of which an internal section is reduced in a flow direction, and then through a cylindrical part comprising the ejection orifice, of which an internal section corresponds to a smallest internal section of the conical part, and to the internal section of the ejection orifice and the airflow ejected via the ejection orifice is configured to blow air on the sheets of glass; and
a roller bed conveying the sheets of glass, an axis of the ejection orifice passing between two rollers of the roller bed,
the cylindrical part of the at least one nozzle having a length which is greater than 6 times the diameter of the ejection orifice,
wherein the at least one nozzle further comprises an non-linear additional tubular part located between a large base of the conical part and the box, and
wherein the internal section of the non-linear additional tubular part has a uniform diameter that is equal to a largest internal section of the conical part.

23. A device for cooling sheets of glass by jets of air emitted by at least one nozzle in a form of a pipe, comprising:
a box supplying the at least one nozzle with air,
wherein airflow ejected via an ejection orifice of the at least one nozzle passes successively through a conical part, of which an internal section is reduced in a flow direction, and then through a cylindrical part comprising the ejection orifice, of which an internal section corresponds to a smallest internal section of the conical part, and to the internal section of the ejection orifice and the airflow ejected via the ejection orifice is configured to blow air on the sheets of glass,
the cylindrical part of the at least one nozzle having a length which is greater than 6 times the diameter of the ejection orifice,
wherein the at least one nozzle further comprises an additional tubular part located between a large base of the conical part and the box,
wherein the internal section of the additional tubular part is equal to a largest internal section of the conical part,
wherein the cylindrical part of the at least one nozzle has a length which is less than 20 times the diameter of the ejection orifice,
wherein the diameter of the ejection orifice is greater than 4 mm and less than 20 mm,
wherein the conical part has a length which is greater than 10 mm, and
wherein the conical part has a length which is less than 270 mm.

24. The device as claimed in claim 23, further comprising a fan to convey air through the at least one nozzle.

25. The device as claimed in claim 23, further comprising a roller bed conveying the sheets of glass, the axis of the ejection orifice being located between two rollers of the roller bed.

26. The device as claimed in claim 23, wherein the ejection orifice is located between two rollers of the roller bed.

27. The device as claimed in claim 23, wherein the additional tubular part is non-linear.

28. The device as claimed in claim 23, wherein said additional tubular part is configured non-linearly such that said additional tubular part connects with said box at a location that is not on an axis of the ejection orifice.

29. The device as claimed in claim 23, wherein the diameter of the ejection orifice ranges between 6 and 15 mm.

30. The device as claimed in claim 23, wherein the half-angle at the apex of the conical part is 7° to 35°.

31. The device as claimed in claim 30, wherein the half-angle at the apex of the conical part is 10° to 25°.

32. The device as claimed in claim 23, comprising a plurality of nozzles.

33. A method for preparing a sheet of glass comprising:
heating the sheet; and
then cooling the sheet by emission of air by a device for cooling sheets of glass by jets of air emitted by at least one nozzle in a form of a pipe, the device comprising:
a box supplying the at least one nozzle with air, wherein airflow ejected via an ejection orifice of the at least one nozzle passes successively through a conical part, of which an internal section is reduced in a flow direction, and then through a cylindrical part comprising the ejection orifice, of which an internal section corresponds to a smallest internal section of the conical part, and to the internal section of the ejection orifice and the airflow ejected via the ejection orifice is configured to blow air on the sheets of glass; and
a roller bed conveying the sheets of glass, an axis of the ejection orifice passing between two rollers of the roller bed,
wherein the cylindrical part of the at least one nozzle having a length which is greater than 6 times the diameter of the ejection orifice,
wherein the at least one nozzle further comprises an additional tubular part located between a large base of the conical part and the box,
wherein the internal section of the additional tubular part is equal to a largest internal section of the conical part and
wherein the additional tubular part is non-linear.

34. The method as claimed in claim 33, wherein a hardening is obtained by the cooling process.

35. The method as claimed in claim 34, wherein the cooling includes a tempering process.

36. The method as claimed in claim 33, wherein the sheet moves during the emission of air.

* * * * *